United States Patent [19]

Williams

[11] 3,956,636

[45] May 11, 1976

[54] METHOD AND APPARATUS FOR INSPECTING AND SORTING BUTTONS

[75] Inventor: Charles H. Williams, Export, Pa.

[73] Assignee: Koppers Company, Inc., Pittsburgh, Pa.

[22] Filed: Feb. 21, 1974

[21] Appl. No.: 444,498

[52] U.S. Cl. .................. 250/572; 250/562; 250/209; 209/111.7 T; 356/239

[51] Int. Cl.[2] .................. G01N 21/32

[58] Field of Search .......... 250/572, 578, 562, 563, 250/222 R, 222 PC, 209; 356/239, 206; 209/111.7

[56] References Cited

UNITED STATES PATENTS

| | | | |
|---|---|---|---|
| 2,332,308 | 10/1943 | Dresser | 250/223 X |
| 2,351,702 | 6/1944 | Peterson | 250/206 X |
| 2,967,947 | 1/1961 | Flook, Jr. | 250/562 |
| 3,191,773 | 6/1965 | Wyman | 250/223 B |
| 3,292,785 | 12/1966 | Calhoun | 250/223 B |
| 3,316,411 | 4/1967 | Linderman | 250/562 X |

*Primary Examiner*—Walter Stolwein
*Attorney, Agent, or Firm*—Robert D. Yeager; Howard G. Massung

[57] ABSTRACT

The present invention provides a method and apparatus for inspecting and sorting buttons and the like. The inspection means includes a main chamber having a first aperture opening with a diameter substantially equal to the diameter of the buttons to be inspected and a center on the optical axis of said chamber. The inspection means and/or the sorting means of the invention includes means for aligning each button in a rapid succession of buttons at the first aperture opening. A light source is positioned to direct a beam of light through a button stationed at the aperture and along the optical axis of the chamber. Positioned within the main chamber and on the optical axis thereof is a light reflecting means for reflecting the transmitted beam of light. Preferably, four light receiving members, each member having a first and second end and being spaced apart 90° from two other members, are positioned in a plane normal to said optical axis. The first end of each member comprises a second aperture positioned adjacent said light reflecting means for receiving light therefrom. The second end of each of said members includes a photosensor means for detecting the reflected light through said second aperture to produce an output signal. A logic circuit is electrically connected to each of the photosensor means for comparing the output signals and providing an inspection signal. Preferably, a sorting means is provided in combination with the inspection apparatus and responsive thereto for rejecting or accepting inspected buttons in accordance with the inspection signal provided.

15 Claims, 7 Drawing Figures

METHOD AND APPARATUS FOR INSPECTING AND SORTING BUTTONS

FIELD OF THE INVENTION

The present invention provides a method and apparatus for inspecting buttons, and, in particular, to a method and apparatus for rapid inspection and rejection of defective buttons.

BACKGROUND OF THE INVENTION

In the manufacture of buttons and the like thread holes or eyes are placed in the center of the button. These holes, however, may be partially or totally filled by a web or flash of material or they may off-set relative to the desired position. In addition to misplacement of the holes, one or more holes may be entirely missing from the button. Buttons with these common flaws are unsuitable for use in the manufacture of clothing because they cause breakdowns in the threading mahinery used by the clothing manufacturers. Additional defects such as cracks, chips, eccentricity of the button render the buttons unsuitable for use. Accordingly, it is necessary that all of the buttons manufactured be inspected for possible defects, and those that are found to be defective be separated from those that are acceptable for their intended purpose.

Generally, buttons are inspected and sorted by inspectors who sit along a conveyor belt and pick out the occasional bad buttons from thousands of buttons on the line. This type of inspection, however, is generally unproductive because the effectiveness of the sorters is a relatively short duration. Moreover, buttons manufactured from clear or translucent plastics that have small defects such as improper positioning of the openings or flashing therein, cracks and the like are difficult to distinguish from acceptable buttons on a rapidly moving assembly conveyor belt. Notwithstanding numerous methods and apparatus that have been proposed or attempted for inspecting plastic molded articles such as buttons and the like, including U.S. Pat. Nos. 2,332,308 and 2,351,702, the manual method of inspecting and sorting is still widely employed.

Advances in optical and/or optical-electrical scanning procedures have not produced satisfactory results when employed in a high-speed button manufacturing line. Recently, however, a button inspecting system has been devised taking advantage of laser technology and high-speed computers. With this system, the buttons positioned on the conveyor are scanned by the laser and the diffracted light from each of the rapidly scanned buttons is focused through a lens onto a photodetector. The diffraction pattern detected by the photosensor converts the signals into electrical data that the computer can analyze and compare on the basis of information stored within its memory. While this method provides highly reliable sorting information, it is relatively expensive, because of the computer and laser hardware utilized in the system, and difficult to combine with mechanical sorting means that are responsive to the system at the rate for which the system was designed to operate.

Accordingly, it is an object of the present invention to provide a method and apparatus for rapidly inspecting buttons. It is a further object of the invention to provide a sorting means responsive to the inspection apparatus means of the present invention for sorting defective buttons from those that are acceptable.

SUMMARY OF THE INVENTION

Generally, the method of the present invention comprises passing a light beam through each button to be inspected and dividing the light transmitted through each of said buttons into preferably four components that have substantially the same intensity when the button is acceptable. Each of the four light components is converted from optical radiation into an electrical signal that is proportional to the intensity of the respective transmitted components. The electrical signals corresponding to each of the four components are compared. If the difference between the compared electrical signals falls within a selected range, an inspection signal is provided that indicates an acceptable button, and if the difference between the signals is outside of the selected range, an inspection signal is provided that indicates a rejectible button. Preferably, the signal indicating a rejected button is employed to trigger mechanical means for removing the defective button from the work flow stream, and the signal indicating an acceptable button is represented by a null value.

Generally, the present invention provides an apparatus for the inspection of buttons which comprises a main chamber having an optical axis and including a first aperature having a diameter, the center of which is said axis, that is substantially equal to the diameter of the button to be inspected. The main chamber may include a tubular or cylindrical extension member attached thereto and having said first aperture located at the end thereof. Preferably, if an extension is utilized, the diameter thereof is substantially equal to the aperture opening and is adapted to mount to a sorting means for removing the defective button from the work stream. At the first aperture of the main chamber is positioned a means for aligning a button within the aperture opening. Preferably, the means for aligning the button in the aperture opening comprises a channel in which successive buttons may move in rapid sequence in front of the aperture opening. The rapid sequence of buttons is preferably disturbed only by the momentary pause in front of the said aperture for inspection. Means for directing a light beam through the button and along the optical axis of the main chamber is provided. The light generating means may provide light of any desired wavelength including infrared and ultraviolet.

Positioned within the main chamber at an end opposite from the aperture opening and along the optical axis thereof is a light reflecting means. Preferably, the light reflecting means is adapted to provide a peak reflectivity at the wavelength of the light source and may comprise a geometrical surface that provides a maximum division of the transmitted beam. For example, a spherical member, a quadralateral pyramid reflecting surface, and the like have been found suitable for use in the present invention. Preferably the light reflecting means is adjustably positionable along the optical axis of the main chamber and may include guide means to maintain optimum position within the chamber itself.

Four light receiving members, each having first and second ends, are positioned in a plane normal to said optical axis and spaced 90° apart from two other like members. The first end of each of said members comprises a second aperture positioned adjacent to the light reflecting means within said main chamber. The second end of each of said members includes a photosensor or detector means for detecting the reflected light passing through the second aperture of each of said light receiving members. The photosensor means provide an output signal proportional to the intensity of the reflected light within each of the respective light receiving members. While four light receiving members are preferred, the invention is not limited thereto. For example, inspection means employing two light receiving members have been demonstrated. They are not preferred, however, because of their relatively lower accuracy. More than four members, on the other hand, does not substantially increase the accuracy of the device in relation to the added cost and complexity entailed thereby. Accordingly, four light receiving members have been found particularly suited for use in the present invention.

Each of the photosensor means is electrically connected to a logic circuit for comparing each of said output signals to provide an inspection signal. The inspection signal, in a manual sorting operation, provides a visible or audible accept or reject indication. Preferably, however, a sorting means responsive to the inspection signal is provided for removing defective buttons from the work stream.

Generally, the sorting means of the present invention is responsive to the inspection signal, and preferably includes a hopper for the storage of a plurality of buttons to be inspected. The hopper is provided with an opening at the bottom thereof and chute for directing the buttons from the hopper to a sorting plate. Preferably, the chute comprises a pair of parallel guide members for successive delivery of buttons in a position aligned to register with the aperture of the inspection apparatus mounted to the back of the chute. A rotatable sorter wheel is provided that includes a number of slots around its periphery, each of which are adapted to sequentially register with the discharge end of the chute and receive a button therefrom after inspection. Each slot is adapted to retain the received button during a portion of the wheel's revolution. Thus, after the button passes in front of the first aperture opening of the inspection means and into the slot, it is retained with the sorter wheel until the slot reaches an accept or reject discharge station. Whether the button is discharged at the accept or reject station depends upon the inspection signal associated with that button.

The sorter of the present invention preferably includes a shutter means having openings therein and rotatable with the sorter wheel for permitting the passage of light through the button when said button is aligned in registry with the first aperture opening. Associated and radially aligned with each slot about the periphery of the sorter wheel is a selectively engagable latch bar which when activated, for example by a reject inspection signal, permits a pin associated therewith to assume a second position. As the sorter wheel rotates together with the associated pins and latch means, a pin in the second position engages drive opening in a geneva of index plate to rotate the geneva plate with respect to said sorting plate. Radially associated with each engagable drive opening is an opening adapted for alignment with the slot about the periphery of the sorting wheel during rotation of said sorter wheel and engaged plate. Thus, when a defective button triggers a reject signal which causes said pin to assume a second position for engaging the drive openings in the geneva plate, the slot in said sorter wheel containing said defective button is aligned with the associated opening in the geneva plate. At the position of concentric alignment of the sorter slot opening and the geneva plate opening a vacuum take-off means is provided to draw the defective button from the sorter means into a reject hopper.

On the other hand, when no reject signal is triggered, the pin of latch means remains in a first nonengaging position which permits the pin to avoid engagement with the openings in the geneva plate. Thus, as the sorter wheel rotates with the button accepted by the inspection apparatus, it will be moved from the chute to an accept discharge hopper for eventual utilization and pass over the geneva plate without the slot indexing with the associated opening in the geneva plate.

The inspection apparatus of the present invention together with the sorter means of the present invention responsive to said inspection apparatus provides high speed, high accuracy inspection and sorting of buttons. Other advantages of the present invention will become apparent from a perusal of the following detailed description of a presently preferred embodiment taken in connection with the accompanying drawings.

PRESENTLY PREFERRED EMBODIMENT

Figure 1:
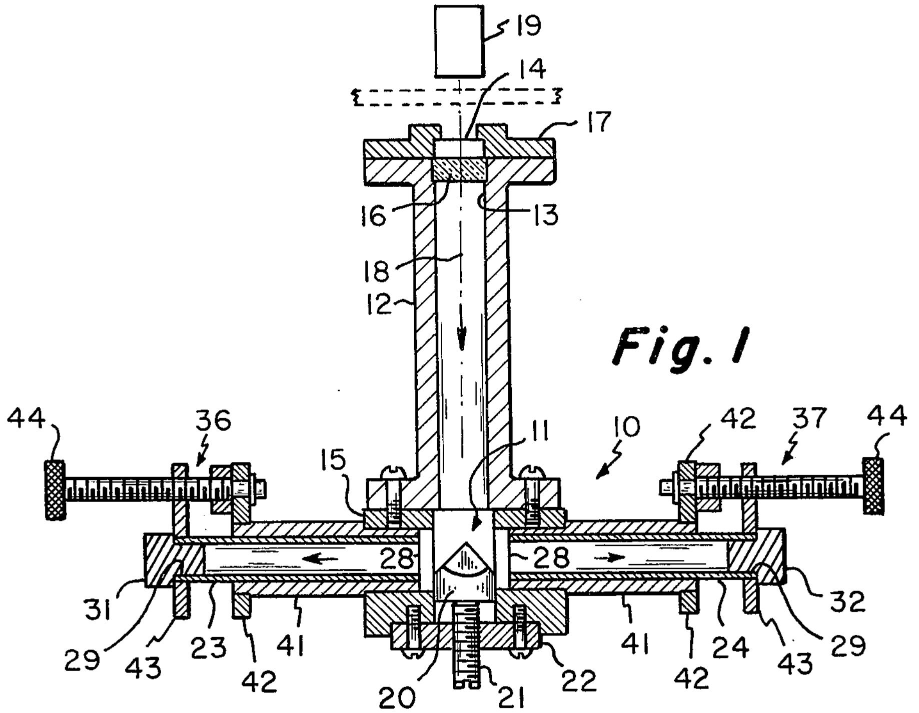
FIG. 1 is a sectional elevation of the inspection apparatus of the present invention taken along line I—I of FIG. 2.
Figure 2:
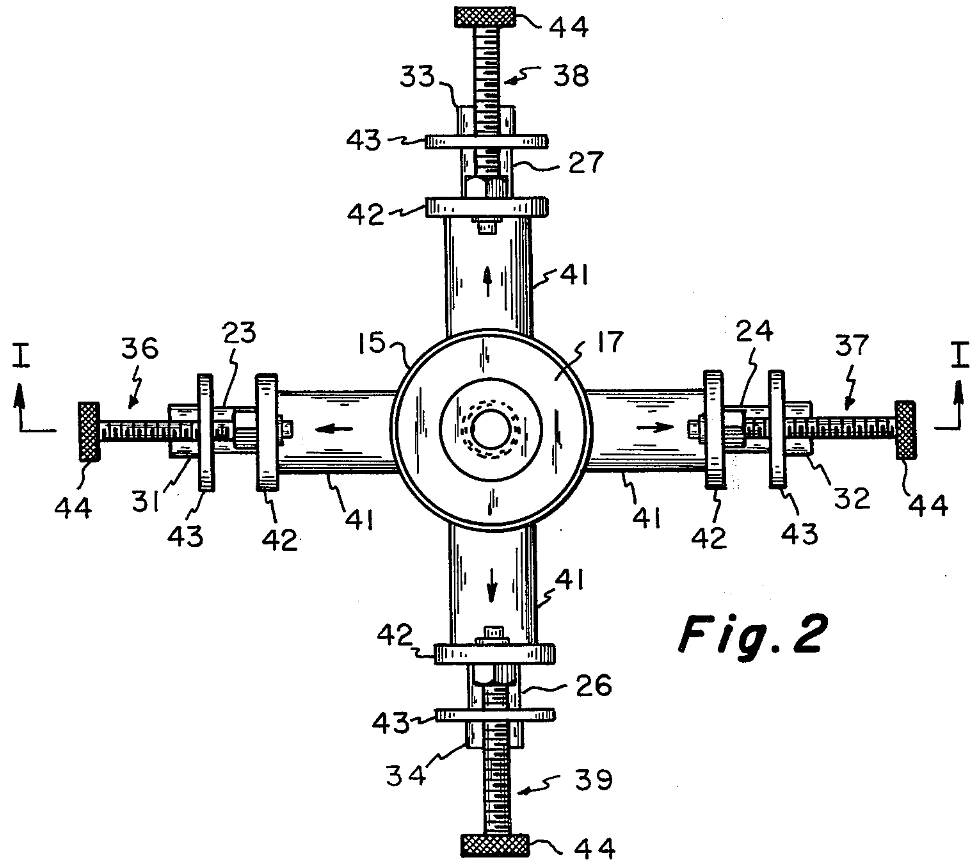
FIG. 2 is a plan view of the inspection apparatus.
Figure 3:
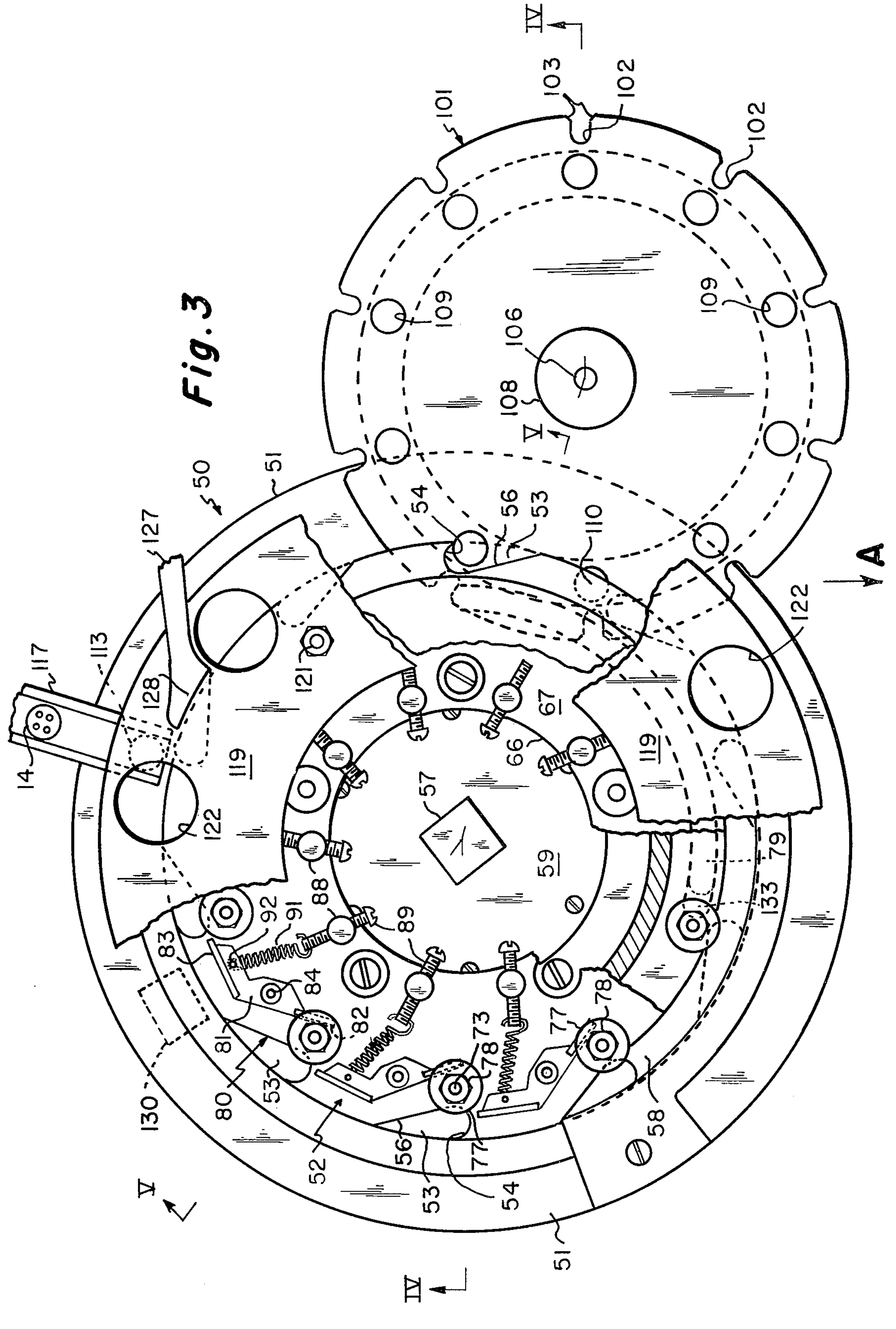
FIG. 3 is a plan view in partial breakaway of the sorter means of the present invention for use with the inspection apparatus of FIG. 1.
Figure 4:
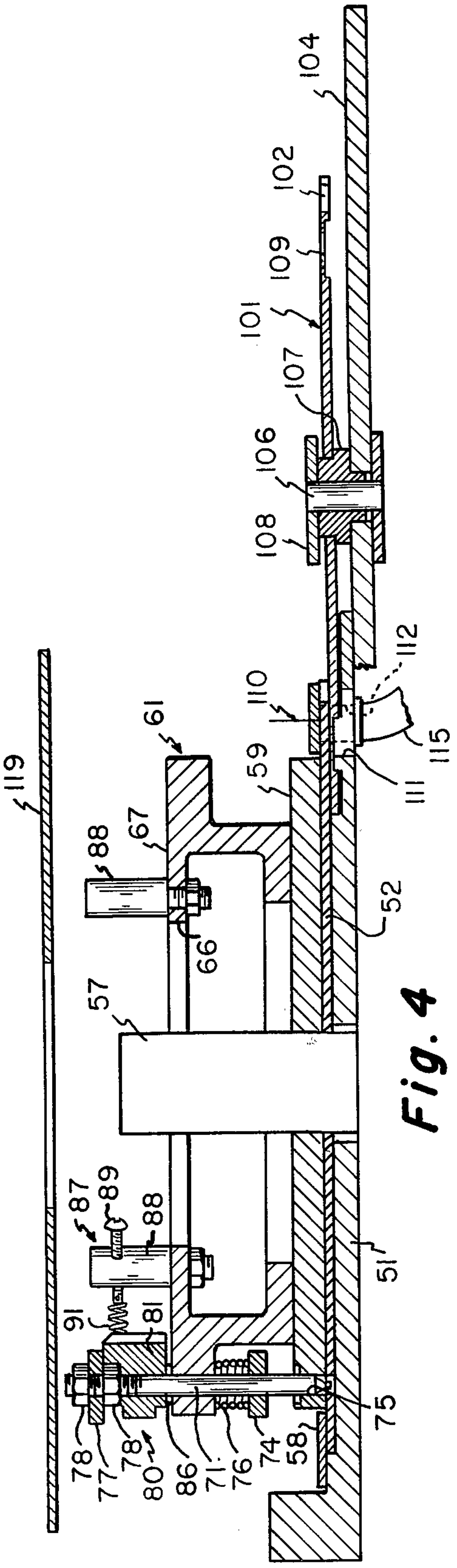
FIG. 4 is a sectional elevation taken along line IV—IV of FIG. 3.
Figure 6:
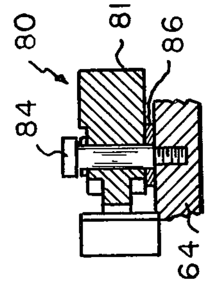
FIG. 6 is an enlarged sectional view of the latch bar and latch bar mounting supports of the supporting means of FIG. 3.
Figure 5:
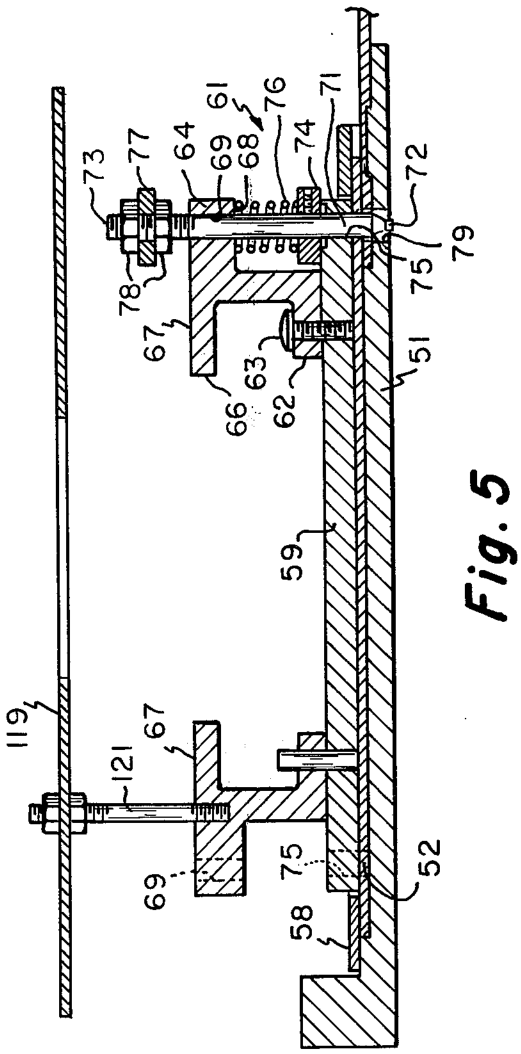
FIG. 5 is a sectional elevation taken along line V—V of FIG. 3.

With reference to FIGS. 1 and 2, button inspecting means or apparatus 10 is shown. Inspection means 10 comprises a main chamber or light trap 11. As shown, main chamber 11 includes a cylindrial extension member 12 having a first aperture 13 at one end thereof which is of substantially the same diameter as button 14 to be inspected. While main chamber 11 is shown with extension member 12 mounted thereto for facilitating the mounting of inspection means 10 to a preferred sorting means, described with more particularity hereinafter, it is clear that aperture 13 may be alternatively located within flange 15 of chamber 11. Mounted within aperture 13 is transparent support back member 16 for supporting button 14 at aperture 13. Support member 16 is preferably made of glass, but may be made of any material which transmits the selected wavelength of light directed therethrough and which is not easily abraded or scratched.

Mounted to extension member 12 at aperture 13 is aligning means 17 for aligning button 14 adjacent aperture 13 on the optical axis 18 of chamber 11. Where inspection apparatus 10 is used in combination with a sorting means responsive thereto, aligning means 17 preferably comprises a chute for directing in rapid succession buttons 14 from a storage site to the sorter means of the present invention. A light source 19 is mounted on optical axis 18 for directing a beam of light through button 14 into chamber 11. Light source 19 may provide a light beam having any desired wavelength such as infrared, visible or ultraviolet. Preferably, a monochromatic light source is utilized; however, if the coherent light source 19 is employed, a lens system may be necessary in order that the beam encompass the entirety of button 14.

Mounted in main chamber 11 and along optical axis 18 thereof is light reflecting means 20. Preferably, light reflecting means 20 comprises a quadralateral pyramid having a reflective surface with peak reflectivity at the wavelength of light source 19. Reflecting means 20 may be, for example, made of glass or plastic having a sputtered silver surface or may comprise a highly polished chromium metal where visible light is used. Other geometrical configurations have been found suitable for use as reflecting means 20, such as spherical reflectors and the like. Preferably, reflecting means 20 is mounted on adjusting screw 21 for adjustably positioning the reflecting means within chamber 11 along optical axis 18. As shown, adjusting screw 21 is threadably engaged in flange 22 of chamber 11.

Inspection means 10 includes light receiving means positioned in a plane normal to optical axis 18. Preferably, four light receiving members 23, 24, 26 and 27 are positioned in said plane at a 90° angle with respect to each other. Each of said receiving members include a first end 28 and a second end 29. First end 28 of each of said receiving members is positioned adjacent to light reflecting means 20. Light reflecting means 20 is adjusted along vertical axis 18 so that the axis of each light receiving member intersects optical axis 18 for equally directing light from aperture 13 into each of light receiving members 23, 24, 26 and 27, respectively.

Second end 29 of each of said light receiving members 23, 24, 26 and 27 includes a photoelectric cell 31, 32, 33 and 34, respectively. The photosensors suitable for use are selected to have a peak sensitivity at the wavelength of light from source 19. Each of said photosensitive cells 31, 32, 33 and 34 is positioned with its active surface facing light reflecting means 20 and along the axis of the light receiving members, and each of said cells is positioned such that its light sensitive surface is of a distance from the optical axis 18 of chamber 11 so as to provide the desired selectivity range.

To facilitate the placement of the photosensor means with respect to the optical axis of inspecting device 10, each light receiving member 23, 24, 26 and 27 includes adjusting means 36, 37, 38 and 39, respectively. Each of said adjusting means comprises a fixed housing member 41 in which each of said respective light receiving members is slidably engaged. Each housing member 41 includes a first flange 42. A second flange 43 is mounted to second end 29 of each light receiving member, and adjusting screw 44 is rotatably engaged with first flange 42 and threadably engaged in second flange 43. Therefore, by rotation of adjusting screw 44 the relative linear displacement of each of said light receiving members to said fixed housing 41 may be achieved.

Initial calibration of inspecting device 10 is achieved by passing a light beam from light source 19 through aperture 13 along optical axis 18 to light reflecting member 20. Light reflecting member 20 is adjusted so that the light beam impinging is reflected along the axis of each of said four light receiving members. The output signals of photosensors 31, 32, 33 and 34 are equalized by adjusting means 36, 37, 38 and 39, respectively. Thus, when an acceptable button 14 is aligned with respect to aperture 13 a light passing through the translucent button and/or the thread eyes thereof should provide substantially equal signals from each of said photocells. If a button is defective, such as the thread eyes are mislocated with respect to the center of the button, the thread eyes include a flash and/or the button is cracked or chipped, the cross-section of the light beam having passed therethrough will have intensity variations that produce unequal output signals from each of the photosensors. These signals are then compared and deviation from a selected range can be used as a reject inspection signal. Methods for comparing the electrical output signal as well as means therefor will be shown and described with reference to FIG. 7 hereinafter.

Referring to FIGS. 3–6, a presently preferred sorting means 50 is shown for use with inspecting device 10. Sorting means 50 includes circular base member 51 and a sorter wheel 52 is mounted for rotation with respect to base plate 51. Sorter wheel 52 includes a plurality of slots 53 about the periphery thereof. Slots 53 have a circular end portion 54 having a diameter substantially equal to the diameter of the buttons to be inspected and sorted. Circular end portion 54 of each of said slots 53 opens to the periphery of said sorter wheel 52 along an edge 56 which tangentially extends from said circular end portion 54 to the outer perimeter of sorter wheel 52. Sorter wheel 52 is engagably connected to drive shaft 57 for rotation therewith. Drive shaft 57 is connected to a means for rotating said shaft (not shown).

Mounted to and adapted for rotation with sorter wheel 52 is sorter shield 58 having an outer diameter greater than sorter wheel 52 and an inner diameter that substantially coincides with the outer diameter of sorter wheel 52 less the diameter of end portion 54 of slots 53. Sorter shield 58, therefore, is adapted to cover each of said slots 53 to retain a button positioned in the end portions 54 thereof between said shield and base member 51.

Mounted to and adapted for rotation with sorter wheel 52 is booster plate 59. Booster plate 59 is preferably connected to drive means 57. Mounted to booster plate 59 is latch mounting support 61. Latch mounting support 61 includes annular mounting flange 62 having a plurality of openings therein to receive securing means 63. Latch mounting support 61 includes an outer peripheral flange member 64 and an inner peripheral flange member 66, both of which define mounting surface 67. Outer peripheral flange member 64 includes a lower annular flange surface 68, and a plurality, equal in number to the number of slots 53, of openings 69 extending from the supper surface 67 of flange 64 to lower surface 68 thereof. Each of said openings has a center that is located along a radial line passing through the center of end portion 54 of each slot 53.

Slidably mounted in each of said openings 69 are drive pins 71. Each of said drive pins 71 include a drive engaging portion 72 at one end and a threaded end portion 73 at the other end. Spring retainer 74 is securely mounted to pin drive 71, and is adapted to retain compression spring 76 mounted between the upper surface of spring retainer 74 and surface 68 of outer flange 64. Threadably secured to upper portion 73 of drive pin 71 is latching washer 77. Latching washer 77 is securely and adjustably positioned on end portion 73 by means of upper and lower nuts 78.

A plurality, equal in number to the number of pins 71, of latching assemblies 80 are mounted to upper surface 67 of latch mounting support 61. Each latching assembly 80 comprises a latch bar 81, see FIG. 3, having a first engaging surface 82 adapted to engage the undersurface of latching washer 77 and a second engaging surface 83 adapted to engage means for selectively positioning latch bar 81. Preferably, surface 83 is made of iron or steel for selective positioning by magnetic energy. Latch bar 81 is rotatably mounted to surface 67 of outer perimeter flange 64 by means of shoulder screw 84 and washer 86, see FIG. 6. Latch biasing means 87 is mounted to surface 67 of inner perimeter flange 66. Latch biasing means 87 comprises adjusting screw block 88 having positioned therethrough adjusting screw 89. A tension spring 91 is connected to adjusting screw 89 and to latch bar 81 securing screw 92 positioned behind second engaging surface 83 of latch bar 81. The tension on spring 91 can be adjusted by means of the relative displacement of adjusting screw 89 in adjusting screw block 88.

When latch bar 81 is in the biased position, first engaging surface 82 engages the undersurface of latching washer 77. In this first position drive pin 71 is in a raised attitude that compresses spring 76 between lower surface 68 and shoulder 74. As shall be shown, in the biased position drive pin 71 is not adjusted for drive engagement with an index or geneva plate. When a force, such as a magnetic force, acts upon second engaging surface 83 of latch bar 81 to force said bar to rotate about shoulder screw 84 in a direction against biasing spring 91, compression spring 76 forces spring retainer 74 and, therefore, drive pin 71 into a drive engaging or second position through opening 75 in sorter wheel 52 and plate 59.

Sorter means 50 includes a geneva or index plate 101 that is positioned to slidably rotate over a portion of sorter wheel 52. Indexing plate 101 has an outer diameter equal to the bolt circle comprising the loci of points made up of pins 71. A plurality of drive engaging openings 102 are provided about the periphery of index plate 101. The number of drive engage openings 102 is equal to the number of slots 53 provided in sorter wheel 52. Openings 102 are preferably beveled at periphery engaging edges 103. Indexing wheel 101 is rotatably mounted with respect to base member 104 by means of shaft 106 and index bushing 107. Indexing wheel 101 is retained on bushing 107 by means of retaining washer 108.

Indexing wheel 101 includes a plurality of button pass-through openings 109. Each of said openings 109 lies on a radial line passing through openings 102. The center point of each of said openings 109 is positioned to coincide at position 110 with the center point of an end portion 54 of slots 53 in sorter wheel 52. At location 110, the overlapping intersection of sorter wheel 52 and geneva plate 101 is a vacuum reject station comprising a vacuum plate 111 mounted in base plate 51 having an opening 112 therethrough. Opening 112 has a center point at 110 and a diameter equal to that of pass-through openings 109 and end portions 54 of slot 53. Vacuum discharge pipe 115 is mounted to vacuum plate 111 and in registry with opening 112 therethrough. A vacuum source (not shown) is connected to line 115 for withdrawing from slot 53 a button contained therein through opening 109 in registry therewith to a discharge reject hopper (not shown).

Sorter means 50 includes a chute 117 connected to a source of buttons 14 such as an input hopper (not shown). In this embodiment, chute 117 performs the additional function of aligning buttons in rapid succession from the source thereof with opening 113 which registers with aperture 13 of inspection means 10 of FIG. 1. Thus, each button preferably falls down chute 117 in rapid succession and is aligned with respect to opening 113, and, where inspection means 10 is utilized, with aperture 13 thereof.

A sorter shutter plate 119 is mounted by means of threaded rods 121 to the upper surface of latch support 61. Shutter 119 preferably comprises ân annular disc having an outer diameter slightly greater than the diameter of sorter wheel 52 and an inner diameter less than sorter shield 58. Sorter shutter includes a plurality, equal in number to the number of slots 53, of shutter openings 122 having a diameter larger than aperture opening 113 of chute 117. Preferably, each shutter opening 122 is positioned to overlie the area between adjacent slots 53.

A magnetic member 127 is positioned adjacent chute 117. Magnetic means 127 is positioned so that when a slot 53 is positioned below chute 117 and adapted to accept a button therefrom, second engaging surface 83 of latch bar 81 is adapted to be magnetically drawn toward surface 128 of magnetic member 127.

OPERATION OF SORTER 50

The following description is illustrative of the operation of sorter means 50 with an inspecting means such as tht shown in FIG. 1. Therefore, with reference to FIG. 3, a plurality of buttons would be discharged from a source such as a hopper down chute 117. First button 14 registers with opening 113 in alignment with aperture opening 13 of inspection device 10. Drive shaft 57 continually rotates sorter wheel 52 and thus shutter 119 so that a first shutter opening 122 comes into registry with button 14 and opening 113 to permit passage of light from source 19 perpendicularly mounted with respect thereto to pass therethrough. When shutter opening 122 is in registry with button 14 and light passes therethrough to photosensors 23, 24, 26 and 27 which convert the light reflected by reflecting means 20 to produce an output signal. The output signals of each of the photosensors are compared in a circuit to be described hereinafter to provide an inspection signal.

To provide the desired comparison only when shutter 122 is in full registry with opening 113 and button 14 aligned thereat, an enable switch 130 is provided. Enable switch 130 is positioned, for example, 36° ahead of opening 113 and preferably comprises a photosensor activated by a light source in combination with source 119, which gives an output signal only when the light reaching it has reached a threshold level. The threshold level is selected to correspond to the maximum output of a light beam passing through a second shutter opening 122 only when that opening is in complete registry with switch 130. Accordingly, enable switch 130 is positioned on base member 51 at a location, e.g., 36° from opening 113, that provides registry with a second shutter opening 122 when said second shutter opening is in full registry with opening 113. At that time, and only at that time, will the intensity of the light beam passing through said second shutter opening reach the threshold level and permit enable switch to provide a signal for the electronic circuit to compare the output signals of said photosensors.

If a defect is found, the inspection signal preferably comprises an electrical charge to momentarily energize magnet means 127 or the surface 128 thereof. The momentarily energized surface 128 causes the second engaging surface 83 by latch bar 81 to make contact therewith and thereby rotate said latch bar about screw 84. Said rotation removes first surface 82 from under latch washer 77 permitting compression spring 76 to act against shoulder of spring retainer 74 and force drive pin 71 into the second drive engaging position. As sorter wheel 52 continues to rotate with button 14 contained in slot 53 thereof, engaging portion 72 of pin 71 will engage an opening 102 of index wheel 101. Upon engagement of engaging surface 72 with opening 102 of index wheel 101, the index wheel will counter-rotate with sorter wheel 52 bringing slot 53, containing button 14, into alignment with opening 109 of index plate 101 at point 110. At the moment slot 53 and opening 109 are in alignment with respect to each other at 110, the vacuum from line 115 will cause the button to be drawn out of slot 53 through opening 109 into vacuum discharge reject pipe 115. As sorter wheel 52 continues to rotate, pin 71 disengages from opening 102 and engages drive pin lift track 133. Lift track 133 has a gradually increasing elevation forcing pin 71 to lift against compression spring 76 until biasing spring 91 permits first engaging surface 82 to engage a bottom portion of latch washer 77.

In the case where a button is found not to be defective and, therefore acceptable, no inspection signal is impressed upon magnetic surface 128 and latch means 81 remains in its latched, first position with first surface 82 in engagement with latch washer 77. In such first position, drive pin 71 will not engage an opening 102 of index plate 101, and sorter wheel slot 53 will pass over the surface of nonrotating index plate 101 to permit the button to be discharged at point A of FIG. 3. Preferably, the sorter means is positioned in an inclined positioned so that button 14 will fall out of slot 53 along edge 56 thereof. A large discharge hopper (not shown) may be positioned at position A of FIG. 3 to collect all acceptable buttons for further processing, such as packaging thereof.

Figure 7:
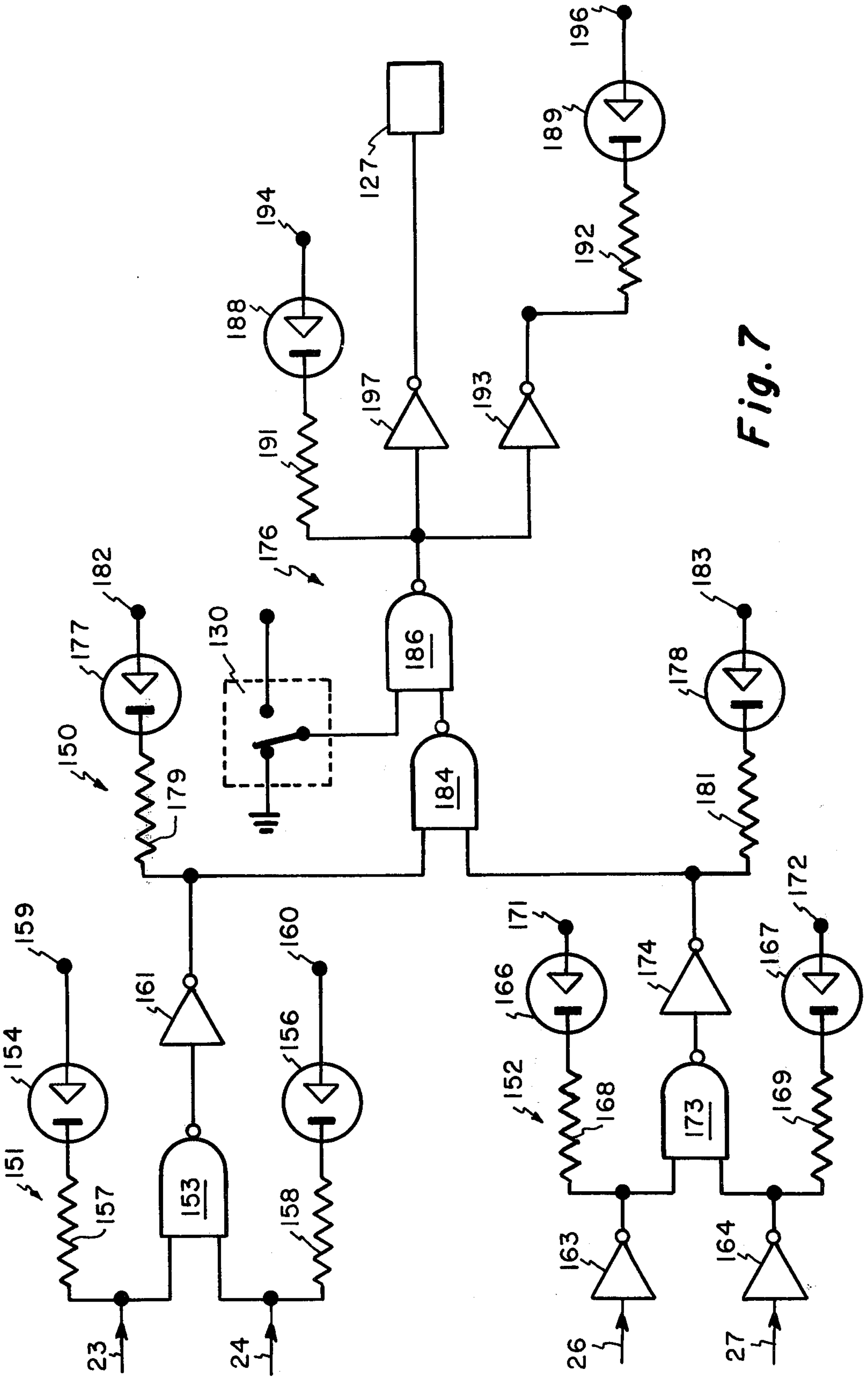
FIG. 7 is a block diagram of a logic circuit for use with the inspection device and sorting means of the present invention.

With reference to FIG. 7, an illustrative logic circuit block diagram is shown for use with inspection device 10 and sorting means 50 of the present invention. Logic means 150 includes first and second NAND circuits 151 and 152. First NAND circuit 151 includes NAND gate means 153 having first and second electrical inputs from photosensors 23 and 24, respectively. Preferably, each circuit of logic means 150 includes visual indicating means for visually displaying the status of each circuit during operation. Accordingly, first NAND circuit 151 includes first and second light emitting diodes 154 and 156 connected to the outputs of photosensors 23 and 24, respectively, through resistors 157 and 158, respectively. Light emitting diodes 154 and 156 are connected to a source of electrical power 159 and 160, respectively. NAND gate means 153 provides a low output signal when both input signals thereto from photosensors 23 and 24 are high; i.e., the output signals of said photosensors are high. If either or both of said signals are low, the output of said NAND gate 153 is high. The output signal of NAND gate 153 thereafter is inverted by means of inverter 161. Thus, if the output from NAND gate 153 is low, inverter 161 provides a high output signal and, conversely, if said signal is high, a low output signal is provided by inverter 161.

Second NAND circuit 152 is substantially identical to first NAND circuit 151 except that the output signals from photosensors 26 and 27 are inverted by means of inverters 164 and 164, respectively, connected to said photosensors. Second NAND circuit 152 includes first and second light emitting diodes 166 and 167 electrically connected through resistors 168 and 169 to inverters 163 and 164, respectively. Light emitting diodes 166 and 167 are connected to sources of electrical power 171 and 172, respectively. The outputs of inverters 163 and 164 comprise the input to NAND gate 173. The output of NAND gate 173 is inverted by means of inverter circuit 174 electrically connected thereto. Thus, where the output signal from photosensors 26 and 27 are both low, the output of second NAND circuit 152 will be high.

Logic means 150 includes third NAND circuit 176 having first and second light emitting diodes 177 and 178 electrically connected through resistors 179 and 181 to inverters 161 and 174, respectively. Light emitting diodes 177 and 178 are electrically connected to power leads 182 and 183, respectively. Third NAND circuit 176 includes first and second NAND gates 184 and 186. First NAND gate 184 is electrically connected to inverters 161 and 174 of first and second NAND circuits 151 and 152, respectively. The output from gate 184 comprise the first input of second gate 186 and the second input thereto comprises the output signal from enable switch 130.

Since enable switch 130 provides an output signal only when second shutter opening 122 is in complete registry with the photosensor of said switch, and thus registry of the first shutter opening with opening 113, an output signal from second NAND gate 186 represents the desired inspection signal. That is, a comparison of the outputs from the respective photosensors 23, 24, 26 and 27 when the maximum light intensity is directed through the button under inspection.

The output signal from 186 is electrically connected to light emitting diodes 188 and 189 through resistors 191 and 192 including inverter 193, respectively. Light emitting diodes 188 and 189 are also connected to electrical power source 194 and 196, respectively. The output of second gate 186 is inverted by inverter 197 to provide the inspection signal that is used to activate magnet means 127.

A number of various methods may be used to obtain highly accurate button inspection signals from circuit 150 in combination with the photosensors of inspection means 10. One preferred method comprises positioning an acceptable button at aperture 13 and passing a beam of light therethrough. The respective photosensors are adjusted by means of adjusting screws 44 while observing the output from light emitting diodes 154, 155, 166 and 167.

For example, photosensors 23 and 24 are selected to provide a high output signal at a selected reflected light intensity level or higher and photosensors 26 and 27 are selected to provide a low output signal at a selected reflected light intensity level or lower. Calibration of photosensors 23 and 24 is obtained by adjusting their relative position until a reject condition is obtained with a good button and then readjusting until a high signal is obtained. Photosensors 26 and 27 are adjusted in the same manner only a low light intensity and signal are obtained. The threshold level of photosensors 23 and 24 is lower than the highest threshold level of photosensors 26 and 27 which overlap in levels establishes the acceptable range. It is thus clear that this range can be adjusted to adapt the inspection to any desired quality control standard.

While circuit 150 is shown for use with high-low photosensors, it is clear that other logic circuits can be advantageously employed to compare the output signals of the photosensors to provide an inspection signal. Moreover, while a presently preferred embodiment of the invention has been shown and described in particularity, it may be otherwise embodied within the scope of the appended claims.

What is claimed is:

1. A method for the inspection of buttons and the like comprising:

A. positioning a button to be inspected in the path of a light beam,

B. dividing any light transmitted through said button into at least two component parts, C. detecting the intensity of each of said parts, D. converting each said intensity into a respective electrical signal, E. comparing said respective signals with one another to detect a difference therebetween and using said difference to detect a defect in said button.

2. A method as set forth in claim 1 wherein said transmitted light is divided into at least four equal parts and comparing each of said signals from each of said parts.

3. An apparatus for inspecting buttons and the like comprising a main chamber having a first aperture opening with a diameter substantially equal to the diameter of the button to be inspected, the center of said aperture defining the optical axis of said chamber; a light source for directing a beam through said aperture and along said optical axis; means for dividing any light passing through said aperture into at least two components, said means positioned within said chamber; at least two light receiving members, each of said members positioned to receive one said components and including a photosensor means for converting received optical energy to an output signal; and a logic circuit, said logic circuit electrically connected to each of said photosensors for comparing said output signals and producing an inspection signal.

4. Apparatus as set forth in claim 3 including means for aligning a button at said first aperture.

5. Apparatus as set forth in claim 3 wherein said means for dividing light comprises a light reflecting member positioned along said optical axis.

6. Apparatus as set forth in claim 5 wherein said light reflecting member divides said beam into at least four equal components.

7. Apparatus as set forth in claim 6 including at least four light receiving members are positioned in a plane normal to the optical axis of said chamber, each of said members being spaced apart 90° from two other said members.

8. An apparatus for inspecting buttons and the like comprising a main chamber having a first aperture opening with a diameter substantially equal to the diameter of a button to be inspected, the center of said aperture defining the optical axis of said chamber; means for aligning said button at said first aperture; a light source for directing a beam through said aperture and along said optical axis; a light reflecting member positioned in said chamber along said axis for reflecting said light normal to said axis; four light receiving members, each having first and second ends and spaced apart 90° from two other of said members and in a plane normal to said axis, the first end of each member comprising a second aperture positioned adjacent said light reflecting means and said second end each including a photosensor for detecting said reflected light through said second aperture to provide an output signal; and a logic circuit electrically connected to each of said photosensors for comparing said output signals and producing an inspection signal.

9. Apparatus as set forth in claim 8 wherein said light reflecting member is adjustably positionable along said optical axis.

10. Apparatus as set forth in claim 8 wherein each of said light receiving members is transversely adjustable with respect to said optical axis.

11. Apparatus as set forth in claim 8 wherein said light reflecting means comprises a quadralateral pyramid reflecting surface.

12. Apparatus as set forth in claim 8 wherein said light reflecting means comprises a sphere.

13. Apparatus as set forth in claim 8 wherein said chamber includes an extension member, said extension member extending along the optical axis of said chamber and having said aperture at one end thereof.

14. Apparatus as set forth in claim 13 wherein said extension member is cylindrical and having a diameter substantially equal to the diameter of said aperture.

15. A method of inspecting an article for a defect comprising the steps of:

dividing a light beam into a plurality of calibrating light beams which have the same relative intensity with a normal article disposed in the path of the undivided light beam;

positioning the article to be inspected in the path of the undivided light beam with the normal article removed;

dividing the light beam into a plurality of light beams;

measuring the respective intensities of said last mentioned light beams;

comparing said measured intensities; and rejecting the article as defective when a difference greater than a predetermined amount exists between said measured intensities of said light beams.

* * * * *